US008986883B2

United States Patent
Morimoto et al.

(10) Patent No.: US 8,986,883 B2
(45) Date of Patent: Mar. 24, 2015

(54) NEGATIVE ELECTRODE FOR LITHIUM SECONDARY BATTERY AND METHOD FOR PRODUCING SAME

(75) Inventors: Hideyuki Morimoto, Kiryu (JP); Shin-ichi Tobishima, Kiryu (JP)

(73) Assignee: National University Corporation Gunma University, Gunma (JP)

( * ) Notice: Subject to any disclaimer, the term of this patent is extended or adjusted under 35 U.S.C. 154(b) by 253 days.

(21) Appl. No.: 13/504,767

(22) PCT Filed: Nov. 10, 2010

(86) PCT No.: PCT/JP2010/069966
§ 371 (c)(1),
(2), (4) Date: Apr. 27, 2012

(87) PCT Pub. No.: WO2011/058981
PCT Pub. Date: May 19, 2011

(65) Prior Publication Data
US 2012/0214063 A1    Aug. 23, 2012

(30) Foreign Application Priority Data
Nov. 16, 2009    (JP) ................. 2009-260750

(51) Int. Cl.
*H01M 4/52* (2010.01)
*H01M 4/62* (2006.01)
(Continued)

(52) U.S. Cl.
CPC .............. *H01M 4/525* (2013.01); *H01M 4/131* (2013.01); *H01M 4/1391* (2013.01); *H01M 4/621* (2013.01); *H01M 4/622* (2013.01); *H01M 2004/027* (2013.01); *Y02E 60/122* (2013.01)
USPC ........................................ 429/211

(58) Field of Classification Search
None
See application file for complete search history.

(56) References Cited

U.S. PATENT DOCUMENTS

2003/0049535 A1    3/2003  Ohta et al.
2003/0148185 A1*   8/2003  Kusumoto et al. ............ 429/233
(Continued)

FOREIGN PATENT DOCUMENTS

CN    1905247    1/2007
JP    09-320569   12/1997
(Continued)

OTHER PUBLICATIONS

Office Action in Korean Application 10-2012-7014102, dated Sep. 12, 2013 along with an english translation thereof.
(Continued)

*Primary Examiner* — Patrick Ryan
*Assistant Examiner* — Wyatt McConnell
(74) *Attorney, Agent, or Firm* — Greenblum & Bernstein, P.L.C.

(57) ABSTRACT

A negative electrode for a lithium secondary battery, in which $\alpha\text{-Fe}_2\text{O}_3$ that is low in cost, has little environmental impact and has high theoretical capacity is used as an active material, maintains high adhesiveness between a current collector and an electrode layer, and can simultaneously achieve both of an improvement in the cycle characteristics and high capacity. In a negative electrode for a lithium secondary battery, which is configured of a current collector, and an electrode layer that is formed on the current collector and contains at least a negative electrode active material, a conductive assistant and a binder component, the negative electrode active material is composed of $\alpha\text{-Fe}_2\text{O}_3$ particles that generate a conversion electrode reaction, the binder component is a mixture of polyamide acid and partially imidized polyamide acid. The electrode layer is configured so that a concentration of the binder component decreases as distanced from the current collector.

7 Claims, 12 Drawing Sheets

(51) Int. Cl.
*H01M 4/525* (2010.01)
*H01M 4/131* (2010.01)
*H01M 4/1391* (2010.01)
*H01M 4/02* (2006.01)

(56) References Cited

U.S. PATENT DOCUMENTS

| | | | |
|---|---|---|---|
| 2005/0244711 A1 | 11/2005 | Fukui et al. | |
| 2007/0026312 A1 | 2/2007 | Imachi et al. | |
| 2008/0124631 A1* | 5/2008 | Fukui et al. | 429/217 |
| 2008/0274403 A1* | 11/2008 | Kim et al. | 429/209 |
| 2009/0123851 A1 | 5/2009 | Soma et al. | |
| 2011/0217594 A1* | 9/2011 | Awano | 429/232 |

FOREIGN PATENT DOCUMENTS

| | | |
|---|---|---|
| JP | 2000-294246 | 10/2000 |
| JP | 2001-345103 | 12/2001 |
| JP | 2002-110221 | 4/2002 |
| JP | 2003-257426 | 9/2003 |
| JP | 2007-317461 | 12/2007 |
| JP | 2008-204777 | 9/2008 |
| JP | 2009-123464 | 6/2009 |
| WO | 2004/004031 | 1/2004 |
| WO | 2008/105036 | 9/2008 |

OTHER PUBLICATIONS

China Office Action in CN201080050970.2, dated Jan. 24, 2014 along with an english translation thereof.
Search report from International Patent Application No. PCT/JP2010/069966, mail date is Feb. 15, 2011.
International Preliminary Report on Patentability PCT/JP2010/069966, mail date is Jun. 21, 2012.
China Office action in CN 201080050970.2, dated Aug. 7, 2014 along with an English translation thereof.
China Office action, dated Nov. 17, 2014 along with an english translation thereof.

* cited by examiner

NEGATIVE ELECTRODE FOR LITHIUM SECONDARY BATTERY AND METHOD FOR PRODUCING SAME

TECHNICAL FIELD

The present invention relates to a negative electrode for a lithium secondary battery, which uses α-Fe$_2$O$_3$ particles that cause a conversion electrode reaction, and a method for producing the same.

BACKGROUND ART

At present time, as a negative electrode material for a lithium battery that is generally used, a carbon material is cited. Since the carbon material has an intercalation reaction, though excellent in the cycle retention rate, it is considered difficult to obtain high capacity. Accordingly, a negative electrode material that can replace the carbon material and has high capacity is under active study.

As a high capacity negative electrode material, low-cost α-Fe$_2$O$_3$ that places little burden on the environment is proposed. The α-Fe$_2$O$_3$ causes a reaction called a conversion electrode reaction expressed by the following formula (1); accordingly, a theoretical capacity thereof is such high as 1007 mAh/g that is about 3 times larger than that of the carbon material that is a conventional negative electrode material.

[Chemical 1]

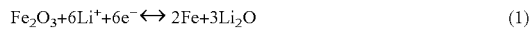

$$Fe_2O_3 + 6Li^+ + 6e^- \leftrightarrow 2Fe + 3Li_2O \qquad (1)$$

However, when the α-Fe$_2$O$_3$ is used as a negative electrode material, in association with the electrode reaction, a volume expansion of about 2 times occurs. As the result thereof, there are various problems that by the volume expansion of α-Fe$_2$O$_3$, an electrode layer is peeled off a boundary between a negative electrode current collector and a negative electrode layer or an electrode structure is broken to result in an irregular electrode reaction, further, because of the use α-Fe$_2$O$_3$a as the negative electrode material, a first time irreversible capacity becomes large and the cycle deterioration is large.

For example, when a negative electrode is formed generally by use of a coating method, firstly, a negative electrode active material, a conductive assistant, and a binder solution are mixed to prepare a paste having proper viscosity. Usually, as the conductive assistant, conductive carbon is used, and as the binder, PVdF (polyvinylidene fluoride) is used. The prepared paste is thinly coated on a copper foil that is used as a current collector, and, after heating in vacuum at 120 to 170° C., dried and pressed. Thereby, a negative electrode composed of the current collector and an electrode layer formed on the current collector is prepared.

Here, when α-Fe$_2$O$_3$ is used as a negative electrode active material, according to conventional heat treatment, the binding force of PVdF used as the binder is not enough. Accordingly, because of large volume expansion of α-Fe$_2$O$_3$ generated during charge and discharge, an electrode layer is peeled off a boundary between the current collector and the electrode layer, or the electrode layer is excessively cracked to result in remarkable capacity deterioration within several cycles.

Further, it is also known that the PVdF used as the binder swells owing to permeation of an electrolytic solution. Specifically, it is generally known that the electrode layer swells by about 10% in a thickness direction to a thickness of the electrode layer before immersing the electrode in the electrolytic solution. It is feared that according to the phenomenon like this, the binding property may be insufficient to further promote the breakdown of the electrode. Still further, there was a problem that owing to the swelling of the binder, contact (adhesion) between the current collector and active material powder or contact between the active material powders with each other are deteriorated to result in being incapable of exhibiting enough performance.

In order to solve the above described problems, there are trials that α-Fe$_2$O$_3$a is nano-particulated or micro-particulated to improve the cycle characteristics (see, for example, Patent Document 1) or an electrode sheet is heated at 300° C. or more to enhance the binding property of the binder.

However, according to the former method described in the Patent Document 1, there were problems that owing to aggregation of particles, an electrode is difficult to prepare, owing to a decrease in an electrode reaction area, the capacity decreases, and owing to an excessive electrochemical reaction with an electrolytic solution, the capacity decreases.

Further, according to the latter method, a material such as copper, which is used as a current collector tends to be oxidized. Accordingly, it is necessary to conduct a heat treatment under, for example, an oxygen-free argon gas atmosphere. As the result thereof, there is a problem of an increase in the production cost. Further, even when the binding property of the binder is enhanced according to the method, the cycle characteristics could not be said sufficiently improved.

As obvious from what was mentioned above, it was difficult to sufficiently derive performance of α-Fe$_2$O$_3$ according to a conventional electrode layer constituent material, in particular, a binder, or according to a conventional method for producing an electrode.

In addition, a method of producing a binder that is used in place of the conventional PVdF, in which, when a binder polymer composed of a polyester amide oligomer containing two or more functional groups selected from a carboxyl group, an amino group and a hydroxyl group in a molecular chain and diisocyanate is dissolved and dispersed in N-methyl-2-pyrolidone, the binder polymer is, after heating at 140 to 180° C. for 1 to 3 hr to dissolve, under stirring, cooled at a rate of temperature decrease of 2 to 10° C./hr to produce a binder is disclosed (see, for example, Patent Document 2).

It is said that the binder obtained according to the method described in the Patent Document 2 does not precipitate when mixed with an active material, does not crack an electrode coating film, has excellent adhesive force with a metal foil, does not change the viscosity of the solution over a long period of time, does not adversely affect on the coating property during production of batteries, can suitably use as a mobile power supply for such as portable electronic equipments and so on, has high capacity and is excellent in the charge/discharge characteristics, and is high in the capacity retention rate even after repetitive use over a long term.

PRIOR ARTS

Patent Documents

Patent Document 1: JP 2008-204777A (Claim 1, paragraph [0017])

Patent Document 2: JPA 2000-294246A (Claim 1, paragraphs [0007] and [0096])

SUMMARY OF THE INVENTION

Problems That the Invention is to Solve

However, the conventional binder described in the Patent Document 2 is not assumed to use α-Fe$_2$O$_3$a particles as an active material, which generate a large volume expansion during charge/discharge, further, even by use of the binder, the electric characteristics such as the charge/discharge cycle characteristics when $\alpha\text{-}Fe_2O_3$ is used as an active material are not sufficiently improved.

The present invention intends to provide a negative electrode for lithium secondary batteries, which, when $\alpha\text{-}Fe_2O_3$ that is low in cost, has little burden on an environment and has high theoretical capacity is used as the active material, maintains high adhesiveness between a current collector and an electrode layer, and can simultaneously achieve both of an improvement in the cycle characteristics and high capacity, and a producing method thereof.

Means for Solving the Problems

According to a first aspect of the present invention, in a negative electrode for a lithium secondary battery configured of a current collector, and an electrode layer that is formed on the current collector and contains at least a negative electrode active material, a conductive assistant and a binder component, the negative electrode active material is composed of $\alpha\text{-}Fe_2O_3$ particles that generate a conversion electrode reaction, and the binder component is composed of a mixture of polyamide acid (polyamic acid) and partially imidized polyamide acid.

According to a second aspect of the invention, in the invention based on the first aspect, further, a concentration of the binder component of the electrode layer is configured so that it decreases as distanced from the current collector.

According to a third aspect of the invention, in the invention based on the first or second aspect, further, a content of the binder component configuring the electrode layer is 3 to 20% by weight.

According to a fourth aspect of the invention, a lithium secondary battery uses the negative electrode based on the first to third aspects.

According to a fifth aspect of the invention, in a method for producing a negative electrode for a lithium secondary battery, in which a slurry containing at least a negative electrode active material, a conductive assistant, a binder and a solvent is coated on a current collector, and the current collector having a coating film is vacuum dried and pressed to form a negative electrode layer containing at least the negative electrode active material, the conductive assistant and the binder component on the current collector, as the negative electrode active material configuring the slurry, $\alpha\text{-}Fe_2O_3$ particles that generate a conversion electrode reaction are used, and as the binder configuring the slurry, polyamide acid (polyamic acid) is used, and the slurry is adjusted to low viscosity of 2 to 3 Pa·s at room temperature, the binder is allowed to naturally sediment in the coating film formed by coating the prepared low viscosity slurry, thereby, the electrode layer formed on the current collector is configured so that a concentration of the binder component decreases as distanced from the current collector. The electrode layer is vacuum dried and pressed to partially imidize the binder, and thereby, the binder component contained in the electrode layer is rendered a mixture of polyamide acid (polyamic acid) and partially imidized polyamide acid.

According to a sixth aspect of the invention, in the invention based on the fifth aspect, further, a content of the binder component configuring the electrode layer is 3 to 20% by weight.

Advantages of the Invention

A negative electrode for a lithium secondary battery of the invention is configured of a current collector, and an electrode layer that is formed on the current collector and contains at least a negative electrode active material, a conductive assistant and a binder component, the negative electrode active material being composed of $\alpha\text{-}Fe_2O_3$ particles that generate a conversion electrode reaction, and, the binder component being a mixture of polyamide acid (polyamic acid) and partially imidized polyamide acid. Like this, when $\alpha\text{-}Fe_2O_3$ that is low in cost, places little burden on the environmental and has high theoretical capacity is used as an active material, by use of a mixture of polyamide acid (polyamic acid) and partially imidized polyamide acid as the binder component, high adhesiveness between the current collector and the electrode layer can be maintained, and both of an improvement in the cycle characteristics and high capacity can be simultaneously achieved.

EMBODIMENTS FOR CARRYING OUT THE INVENTION

In the next place, embodiments for carrying out the present invention will be described with reference to the drawings.

Figure 1:
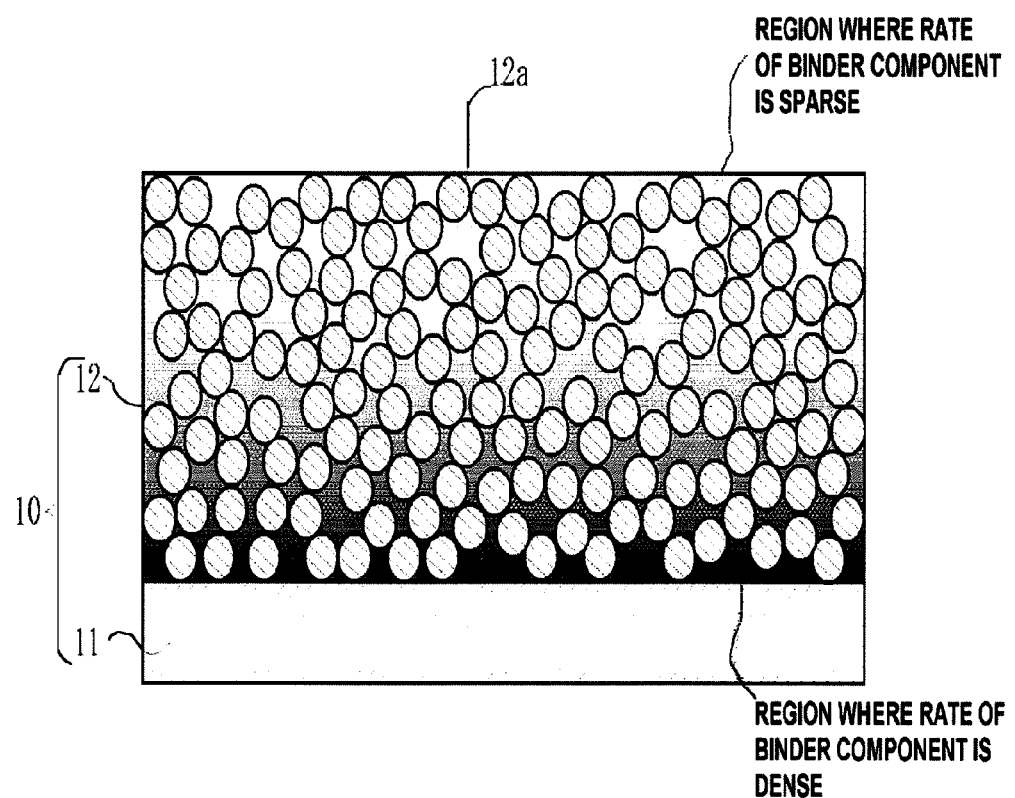
FIG. 1 is a sectional view of a negative electrode for a lithium secondary battery in the present invention.

As is shown in FIG. 1, a negative electrode 10 for a lithium secondary battery of the present invention is configured of a current collector 11, and an electrode layer 12 that is formed on the current collector 11 and contains at least a negative electrode active material 12a, a conductive assistant, and a binder component.

As was described above, $\alpha\text{-}Fe_2O_3$ particles used as the negative electrode active material 12a are composed of a metal oxide that is low in cost, places little environmental burden, and takes care of the environment. Since the $\alpha\text{-}Fe_2O_3$ particles generate a reaction called a conversion electrode reaction shown in the formula (1), the theoretical capacity thereof is such high as 1007 mAh/g that is about 3 times larger than that of a carbon material that has been generally used as a negative electrode active material. On the other hand, the $\alpha$-Fe$_2$O$_3$a particles expand about 2 times in connection with the electrode reaction; accordingly, there have been various inconveniences caused by the volume expansion.

Further, PVdF that has been generally used as a binder component is not enough in the binding force under conventional heat treatment. Accordingly, owing to the large volume expansion of $\alpha$-Fe$_2$O$_3$ generated during charging, the electrode layer is peeled off a boundary between the current collector and the electrode layer, the electrode layer is excessively cracked, as the result thereof, the capacity was remarkably deteriorated after only several cycles. Further, it is also known that owing to permeation of the electrolytic solution, the electrode layer swells. Owing to the phenomena like this, it is feared that the binding property becomes insufficient, and the electrode breakdown was further accelerated. Further, there was a problem that owing to swelling of the binder, contact (adhesiveness) between the current collector and the active material powder and contact between active material powders each other were deteriorated to result in being incapable of showing enough performance.

In the present invention, when the $\alpha$-Fe$_2$O$_3$ particles are used as the negative electrode active material 12a, as the binder component, a mixture of polyamide acid (polyamic acid) and partially imidized polyamide acid is used.

A mixture of polyamide acid and partially imidized polyamide acid, which is used as the binder component, has higher flexibility and higher binding property, is tougher and more excellent in the elastic force, and is smaller in the swelling due to the electrolytic solution than the PVdF that has been generally used as the binder component.

Because of small swelling due to the electrolytic solution, the electrolytic solution can be suppressed or inhibited from permeating, and the electrode layer can be inhibited from deteriorating owing to the swelling caused by the electrolytic solution; accordingly, an improvement in an initial capacity and charge/discharge efficiency during charge/discharge can be achieved. Further, because of high flexibility, high binding property and excellent toughness and elastic force, even when a large volume expansion/contraction is generated accompanying the conversion electrode reaction of $\alpha$-Fe$_2$O$_3$ particles during charge/discharge, the electrode layer structure can be inhibited from breaking down. Accordingly, the cycle characteristics can be improved more than ever, and, excellent binding property between the current collector and the electrode layer and contact between materials configuring the electrode layer can be maintained over a long period of time.

When not only polyamide acid (polyamic acid) but also partially imidized polyamide acid are used together as the binder component, in comparison with the case where polyamide acid alone is used, the electrode layer 12 can be made to have more toughness and elastic property.

It is ideal from the viewpoint of the durability of the electrode layer 12 to use entirely imidized polyamide acid as the binder component configuring the electrode layer 12. However, imidized polyamide acid is difficult to dissolve in an organic solvent and inconvenient to handle; accordingly, polyamide acid cannot be directly contained in the electrode layer in an imidized state.

Accordingly, usually, it is considered to use a method where, by making use of a solution of polyamide acid where polyamide acid is dissolved in an organic solvent, a coating material containing the solution of polyamide acid is coated on a current collector to form a coating film, and the current collector having the coating film is heated to imidize polyamide acid in the film.

However, in order to completely imidize all polyamide acid, generally, it is necessary to heat at a high temperature equal to or more than 350° C. Accordingly, there are problems that when heated to a high temperature like this, the current collector may be oxidized, in order to inhibit the current collector from oxidizing, a special apparatus capable of maintaining an inert gas atmosphere is necessary, and the production cost becomes higher.

Accordingly, when advantages and disadvantages due to the imidization are taken into consideration, there is no need of imidizing all polyamide acid. For example, when polyamide acid is partially imidized by heating to 120 to 200° C. that is a general condition for preparing a negative electrode, compared with the case of the polyamide acid alone, the electrode layer can be made more tough and more elastic. The rate of imidization at this time is 0.3 to 30%.

As a method of obtaining the degree of the imidization, the following method can be cited.

Firstly, as a solvent, N-methyl-2-pyrolidone is used, and polyamide acid is dissolved in the solvent to prepare a solution of polyamide acid. Then, the prepared solution of polyamide acid is dried at about 80° C. to almost completely remove the solvent. Subsequently, with this as a sample, a TG (thermogravimetric) analysis is conducted under the conditions of inert gas atmosphere, temperature increase rate of 5 to 20° C./min, and a temperature range of room temperature to 500° C.

Figure 2:
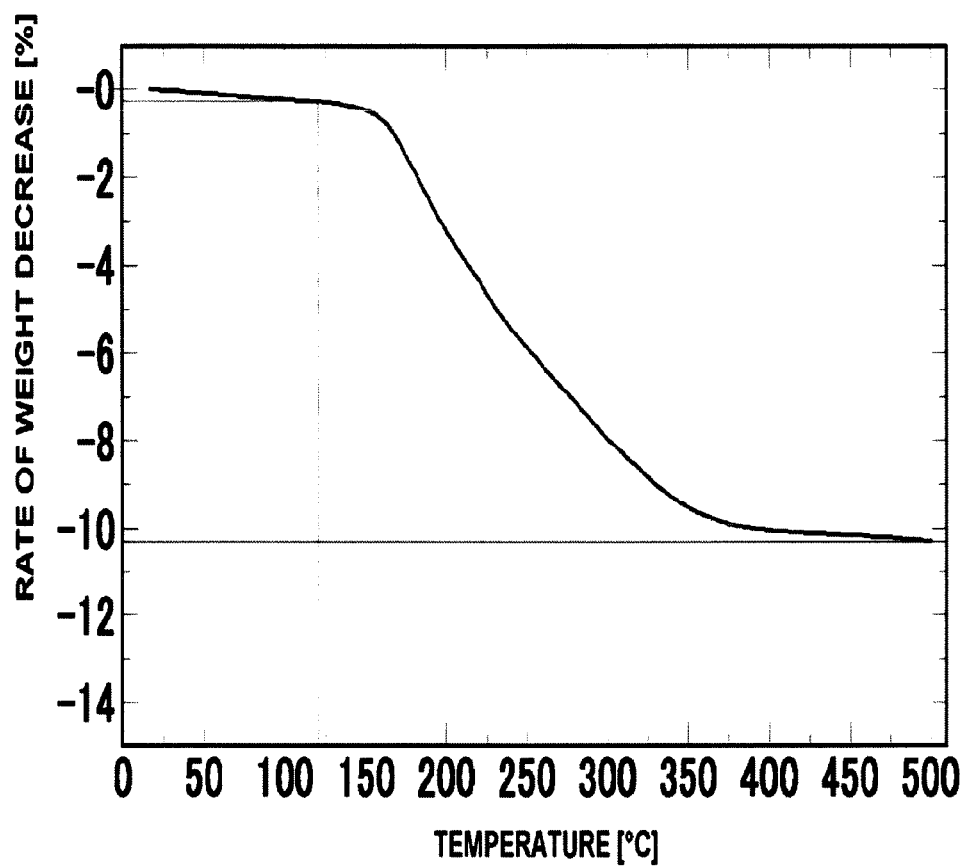
FIG. 2 is a TG curve diagram for obtaining a rate of imidization.

When the TG analysis is conducted under the conditions, a TG curve as shown in FIG. 2 is obtained. As obvious from the TG curve of FIG. 2, a weight at the end of measurement is confirmed to be less by about 10% compared with a weight at the start of measurement. The rate of weight decrease at the end of measurement is defined as the rate of imidization of 100% by assuming that polyamide acid contained in the sample is 100% imidized, and, from a heating temperature when a negative electrode is prepared, by use of the TG curve shown in FIG. 2, the rate of imidization is indirectly obtained.

For example, when a slurry containing polyamide acid is coated on a current collector to form a coating film, and the current collector having the coating film is heated to 120° C. to prepare a negative electrode, from the TG curve shown in FIG. 2, at 120° C., the rate of weight decrease of about 0.2% strong can be obtained. And, from a ratio to the rate of weight decrease when the rate of imidization is taken as 100%, it is derived that the rate of imidization by heating at 120° C. is about 2%.

Returning to FIG. 1, the electrode layer 12 is configured so that a concentration of the binder component of the electrode layer 12 decreases as distanced from the current collector. That is, a current collector 11 side of the electrode layer 12 is made a region that is dense in the rate of the binder component, and an electrolytic solution side of the electrode layer 12 is made a region that is sparse in the rate of the binder component. In FIG. 1, a region where active material particles 12a of the electrode layer 12 are removed is expressed by shading. A region deep in color expresses a region that is dense in the rate of the binder component and a region light in color expresses a region that is sparse in the rate of the binder component.

When the electrode layer 12 is configured as shown above, in a region that is on the side of the electrolytic solution and sparse in the rate of the binder component, owing to an improvement in the permeability of the electrolytic solution, a conduction path of lithium ions can be secured, and an improvement in capacity owing to an increase in an electrode reaction area can be expected. Further, in a region that is on the side of the current collector 11 and is dense in the rate of the binder component, the flexibility and binding property are made higher, toughness and elastic property are imparted, and the electrode layer can be inhibited from peeling off a boundary between the current collector and the electrode layer.

Further, a content of the binder component configuring the electrode layer 12 is preferably 3 to 20% by weight. Among these, the content of the binder component is particularly preferably 8 to 15% by weight. The reason why the content of the binder component is set in the above range is that the rate is appropriate for achieving a discharge capacity close to a theoretical value of $\alpha$-$Fe_2O_3$ particles used as the active material 12a. When the content of the binder component is less than the lower limit, the adhesiveness of the electrode layer 12 is deteriorated. Accordingly, the likelihood of peeling of the electrode layer off the current collector becomes high. When the content of the binder component exceeds the upper limit, an excessive amount of the binder component covers the region on the side of the electrolytic solution of the electrode layer 12 to excessively disturb the movement of lithium ions from the electrolytic solution to result in an abrupt decrease in capacity.

Then, a method for producing a negative electrode for a lithium secondary battery of the present invention will be described.

According to the method for producing a negative electrode for a lithium secondary battery of the present invention, firstly, a slurry containing at least a negative electrode active material, a conductive assistant, a binder and a solvent is prepared. As the negative electrode active material configuring the slurry, $\alpha$-$Fe_2O_3$ particles that generate a conversion electrode reaction are used. The $\alpha$-$Fe_2O_3$ particles are preferable to be fine particles having an average particle size of 300 to 500 nm. Fine particles of $\alpha$-$Fe_2O_3$ having an average particle size of 300 to 500 nm can be prepared according to a solution method or a mechanical milling method. Further, commercially available products such as PRODUCT No. FEO05PB (trade name, manufactured by Kojundo Chemical Laboratory Co., Ltd., purity: 99.99%, particle size: about 500 nm) can be used. As the conductive assistant, Acetylene Black or Ketjen Black can be used. As the binder, polyamide acid (polyamic acid) that is a precursor of polyimide is used. Further, as the solvent, N-methyl-2-pyrolidone (NMP) or xylene is used.

Next, a predetermined amount of the conductive assistant is mixed with the negative electrode active material, to the mixed powder a binder solution obtained by dissolving a binder in a solvent was added and mixed, thereby a slurry is prepared. In the slurry being prepared, a compounding ratio of the negative electrode active material, conductive assistant and binder are appropriately adjusted so that the content of the binder component configuring a finally obtained electrode layer may be 3 to 20% by weight. When the content of binder is less than the lower limit, the adhesive force of the electrode layer in the finally obtained negative electrode is deteriorated to result in high fear of peeling of the electrode layer off the current collector. When the content of the binder component exceeds the upper limit, an excessive amount of the binder component covers the region on the side of the electrolytic solution of the electrode layer to excessively disturb the movement of lithium ions from the electrolytic solution to induce an abrupt decrease in capacity.

Then, the slurry is adjusted to low viscosity of 2 to 3 Pa·s at room temperature. When the once-prepared slurry is adjusted to low viscosity, a solvent is further added to the prepared slurry to adjust the viscosity. The reason why the slurry is adjusted to low viscosity is that when the slurry is coated on the current collector to form a coating film, the binder is allowed to naturally sediment in the film to form a configuration where a concentration of the binder component in the electrode layer formed on the current collector may decrease as distanced from the current collector. When the viscosity of the slurry is less than the lower limit, it is difficult to form a coating film having a desired thickness. In the case where the viscosity of the slurry exceeds the upper limit, when the slurry is coated on the current collector to form a coating film, it is difficult for the binder to naturally sediment in the film. As the result thereof, the side of the current collector of the electrode layer does not form a region where the rate of the binder component is dense. Accordingly, the adhesiveness between the current collector and the electrode layer becomes insufficient to tend to cause peeling of the electrode layer off a boundary between the current collector and the electrode layer during heat treatment.

In the next place, the prepared low viscosity slurry is coated on the current collector to form a coating film. As the current collector, a copper foil, nickel and stainless are used. The low viscosity slurry is coated by use of a doctor blade coating method, an inkjet coating method and so on. A thickness of the coating film is properly adjusted so that a thickness of the electrode layer in the finally obtained negative electrode may be 10 to 30 μm.

In the slurry prepared to relatively low viscosity at room temperature, the fluidity of the binder is high, and in a coating film formed on the current collector by use of the low viscosity slurry, the binder naturally sediments in the film. And, owing to flow of the binder caused by the natural sedimentation, the binder can readily reach the side of the current collector. A lower part of the coating film on the side of the current collector becomes dense in the binder content, and, an upper part of the coating film that is the electrolytic solution side becomes sparse in the binder content. Like this, the electrode layer is configured so that a concentration of the binder component of the electrode layer formed on the current collector in the finally obtained electrode layer decreases as distanced from the current collector.

That is, when a slurry adjusted to appropriate low viscosity at which the binder readily naturally sediments at room temperature is used, by making use of a natural sedimentation phenomenon of the binder contained in the slurry, the binder component of the finally-obtained electrode layer is formed into a sparse and dense configuration.

Next, the current collector having a coating film is vacuum dried and pressed to form an electrode layer containing at least the negative electrode active material, conductive assistant and binder on the current collector. Owing to the vacuum drying and pressing, polyamide acid in the film is partially imidized, thereby the binder component contained in the electrode layer becomes a mixture of polyamide acid and partially imidized polyamide acid. The vacuum drying is conducted at 100 to 250° C. and preferably at 120° C. Further, the pressing is conducted under 3 to 30 MPa, and preferably under 7 to 20MPa. A rate of imidization in the binder component in the electrode layer formed by the vacuum drying at 100 to 250° C. is 0.5 to 60%.

A thickness of the electrode layer 12 formed is suitably 10 to 20 μm. Depending on a magnitude of the negative electrode active material particle used, a thickness of the electrode layer is preferable to be appropriately varied. For example, in proportion to a magnitude of the negative electrode active material particle or the like configuring the electrode layer, a thickness of the electrode layer has to be thickened.

Further, the thickness of the electrode layer tends to exhibit excellent cycle characteristics when the thickness is thinner. This is assumed that when a distance from a contact surface with the electrolytic solution to a boundary between the current collector and the electrode layer is short, the binder present freely on a surface of the active material particles and in the coating film tends to flow toward the current collector by natural sedimentation to completely bury a region near the boundary on the current collector side.

The negative electrode for the lithium secondary battery of the present invention can be formed into a sparse and dense configuration also by, without restricting to the above method, a method where by use of, for example, slurries different in the binder content or slurries different in the viscosity, coating and drying are repeated to laminate to form a sparse and dense configuration. However, when the electrode layer is produced according to the above described method, the production step becomes complicated to be disadvantageous in the production cost.

Next, a lithium secondary battery is formed by use of the negative electrode obtained like this.

The lithium secondary battery of the present invention uses the negative electrode as a constituting member. That is, except that the negative electrode of the present invention is used, elements of the known lithium secondary battery can be adopted as they are. Although there are various shapes such as coin type, button type, cylinder type, and all solid type, known shapes can be adopted as they are.

As an electrode to be a counter electrode, metal lithium, lithium cobalt oxide ($LiCoO_2$), lithium nickel oxide ($LiNiO_2$), lithium manganese oxide ($LiMnO_2$, $LiMn_2O_4$), lithium ferro phosphate ($LiFePO_4$) and so on can be used. As a separator, a polyolefinic porous film, a nonwoven fabric and so on can be used. As an electrolyte, so far known electrolytic solutions and solid electrolytes can be used. For example, as the electrolytic solution, solutions obtained by dissolving an electrolyte such as lithium perchlorate, lithium hexafluorophosphate or the like in a solvent such as ethylene carbonate (EC), dimethyl carbonate (DMC), propylene carbonate (PC), diethyl carbonate (DEC) or the like can be used. Solutions obtained by adding siloxane that is an organic silicon compound, vinylene carbonate, fluoroethylene carbonate or the like to the electrolytic solution can be used.

The lithium secondary battery obtained like this, owing to use of $\alpha$-$Fe_2O_3$ as an active material, is low in cost and places little burden on the environment. Further, since the lithium secondary battery is, with a mixture of polyamide acid and partially imidized polyamide acid as the binder component, configured that a concentration of the binder component in the electrode layer decreases as distanced from the current collector, the high adhesiveness between the current collector and the electrode layer can be maintained, the cycle characteristics are excellent, and higher capacity can be achieved.

EXAMPLES

In what follows, Examples of the present invention will be detailed together with Comparative Examples.

Examples 1 to 4

Firstly, a copper foil as a negative electrode current collector, $\alpha$-$Fe_2O_3$ fine particles having an average particle size of about 300 nm prepared by mechanical milling as a negative electrode active material, acetylene black (AB) as a conductive assistant, N-methyl-2-pyrrolidone (NMP) as a solvent and polyimide acid (polyamic acid) that is a precursor of polyimide as a binder were prepared.

Then, a predetermined amount of the conductive assistant was mixed with the negative electrode active material, and, to the mixed powder, a binder solution that is obtained by dissolving the binder in the solvent and has the viscosity at room temperature of about 5 Pa·s and the density of about 1.1 g/cc was added. By further adding the solvent, the viscosity was adjusted to low viscosity of about 2.5 Pa s at room temperature.

The rate of the negative electrode active material, the AB and the binder (solid product from polyamide acid (polyamic acid)) that configure the finally obtained negative electrode layer by weight ratio was set to a rate shown in the following Table 1.

TABLE 1

| | Rate of active material:AB:Binder [Weight Ratio] |
|---|---|
| Example 1 | 85:5:10 |
| Example 2 | 80.3:4.7:15 |
| Example 3 | 75.6:4.4:20 |
| Example 4 | 66:4:30 |
| Comparative Example 1 | 85:5:10 |

Then, the prepared low viscosity slurry was coated at a desired thickness on the current collector by doctor blade coating method to form a coating film, the current collector having the coating film was vacuum dried (heat treatment) at 120° C. and pressed under pressure of 8 MPa, thereby a negative electrode configured of the current collector and the electrode layer formed on the current collector was obtained. A thickness of the electrode layer of the resulted negative electrode was 10 to 30 μm. Further, the rate of imidization in the binder component in the formed electrode layer was indirectly obtained by use of the TG curve shown in FIG. 2 and found to be about 2% in all of Examples 1 to 4.

Figure 3:
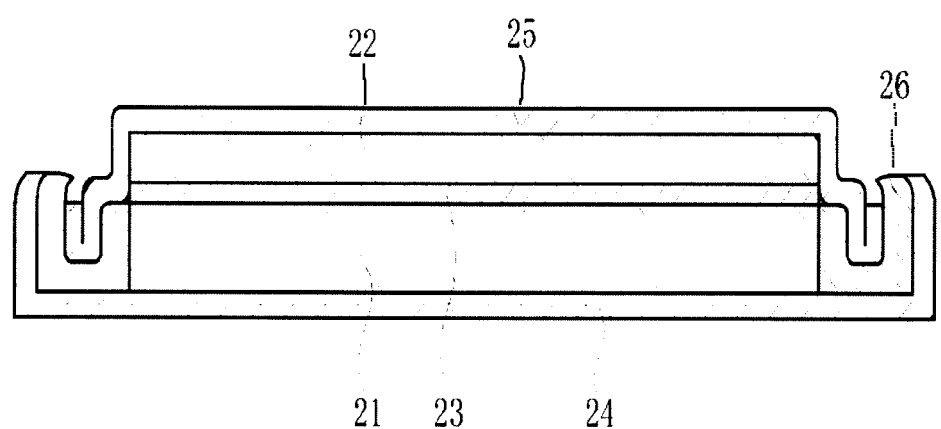
FIG. 3 is a sectional view of a coin lithium secondary battery prepared in each of Examples and Comparative Examples.

Next, a polyethylene porous film having a thickness of 25 μm as a separator, the above-prepared negative electrode as a test electrode, metal lithium as a counter electrode, and 1 mol/dm³ of $LiPF_6$/EC+EMC (30:70% by volume) as an electrolytic solution, respectively, were prepared, and a coin lithium secondary battery as shown in FIG. 3 was prepared.

In FIG. 3, reference numeral 21 denotes a negative electrode, reference numeral 22 denotes a counter electrode lithium metal, reference numeral 23 denotes a separator impregnated with an electrolytic solution, reference numeral 24 denotes a metal exterior can that combines with a negative electrode terminal, reference numeral 25 denotes a sealing plate that combines with a counter electrode terminal, and reference numeral 26 denotes a gasket. By tightening an open end part of the metal exterior can 24 inwardly, the metal exterior can 24 and the sealing plate 25 and gasket 26 hermetically seal the negative electrode 21, the counter electrode 22 and the separator 23 impregnated with the electrolytic solution. Impregnation of the electrolytic solution in the electrode and so on and sealing of the battery were conducted in a glove box where a dry air atmosphere having a dew point of −70° C. is kept.

Comparative Example 1

Except that, as the binder, in place of polyamide acid (polyamic acid) that is a precursor of polyimide, PVdF was used, and a slurry was prepared so that the rate of the negative electrode active material, the AB, and the binder that configure the finally-obtained negative electrode layer may be a rate shown in the Table 1, in a manner similar to Example 1, a negative electrode was prepared, and a coin lithium secondary battery as shown in FIG. 3 was prepared.

<Comparison Test and Evaluation>

Figure 5:
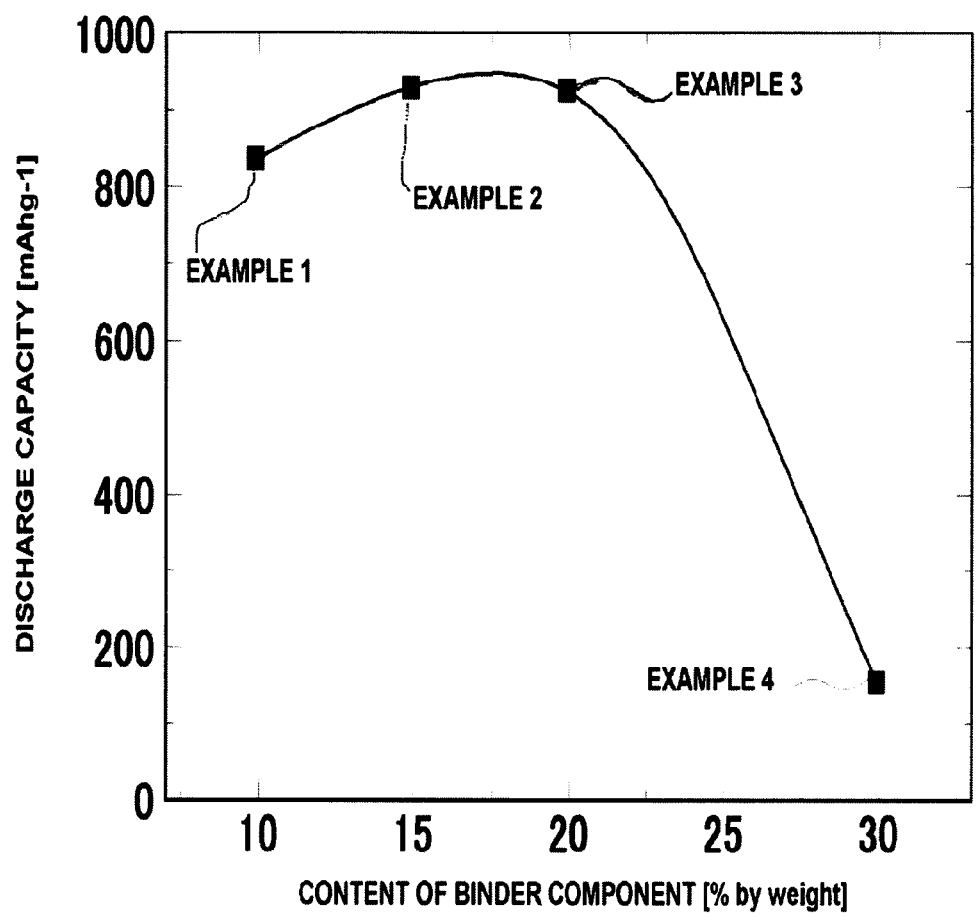
FIG. 5 is a diagram showing a relationship between a binder content and a discharge capacity in lithium secondary batteries of Examples 1 to 4.
Figure 6:
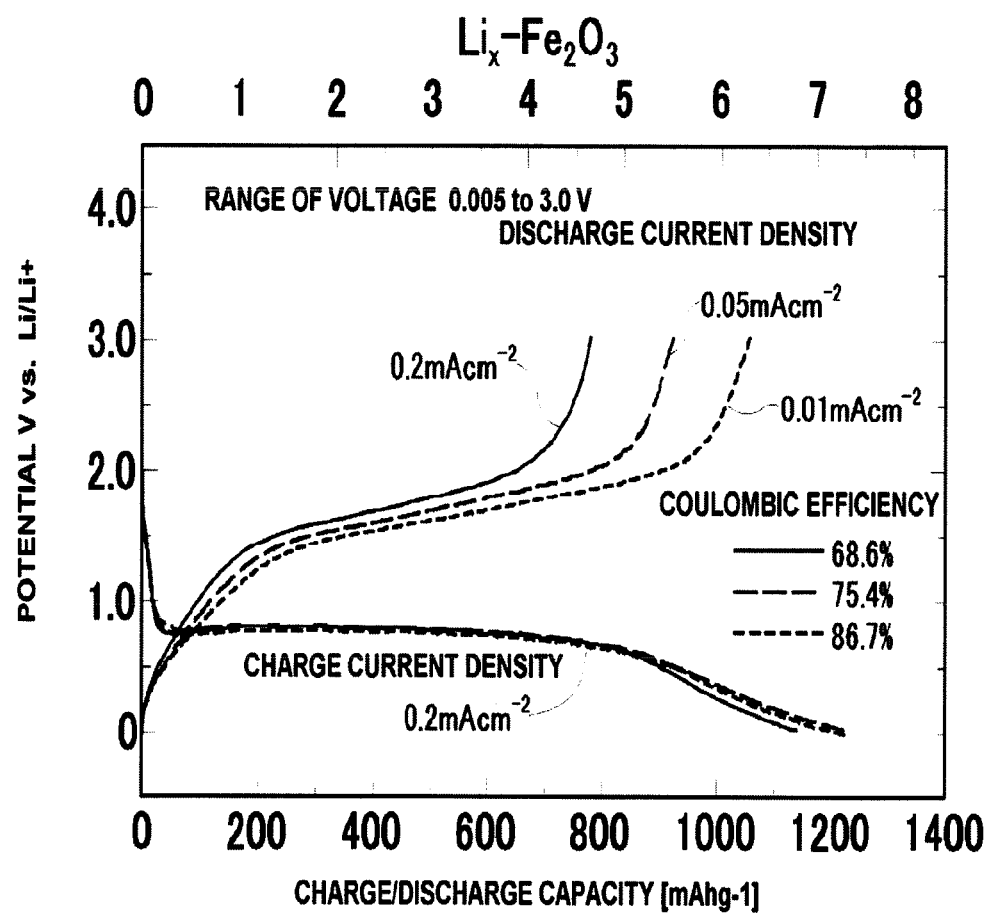
FIG. 6 is a diagram showing the charge/discharge efficiencies (Coulombic efficiencies) in a lithium secondary battery of Example 1.

Each of the coin lithium secondary batteries obtained in Examples 1 to 4 and Comparative Example 1 was subjected to a cycle characteristics test and a discharge current dependence test shown in the following Table 2. A change of discharge capacity to the number of cycles in a lithium secondary battery in each of Example 1 and Comparative Example 1 is shown in FIG. 4, the relationship between the binder content in a lithium secondary battery of each of Examples 1 to 4 and discharge capacity is shown in FIG. 5, and the charge/discharge efficiency (Coulombic efficiency) in a lithium secondary battery of Example 1 is shown in FIG. 6.

TABLE 2

| Test Condition for evaluating cycle characteristics | |
|---|---|
| Range of voltage: | 0.005 V~3.0 V |
| Charge/discharge current density: | 0.2 mA/cm² (At the 1st cycle) |
| | 0.5 mA/cm² (At the 2nd cycle and thereafter) |
| Test Condition of Discharge Current Dependence | |
| Range of voltage: | 0.005 V~3.0 V |
| Charge current density: | Fixed to 0.2 mA/cm2 |
| Discharge current value: | 0.01 mA/cm², 0.05 mA/cm², 0.2 mA/cm² |
| Measurement temperature: | Room temperature |

Figure 4:
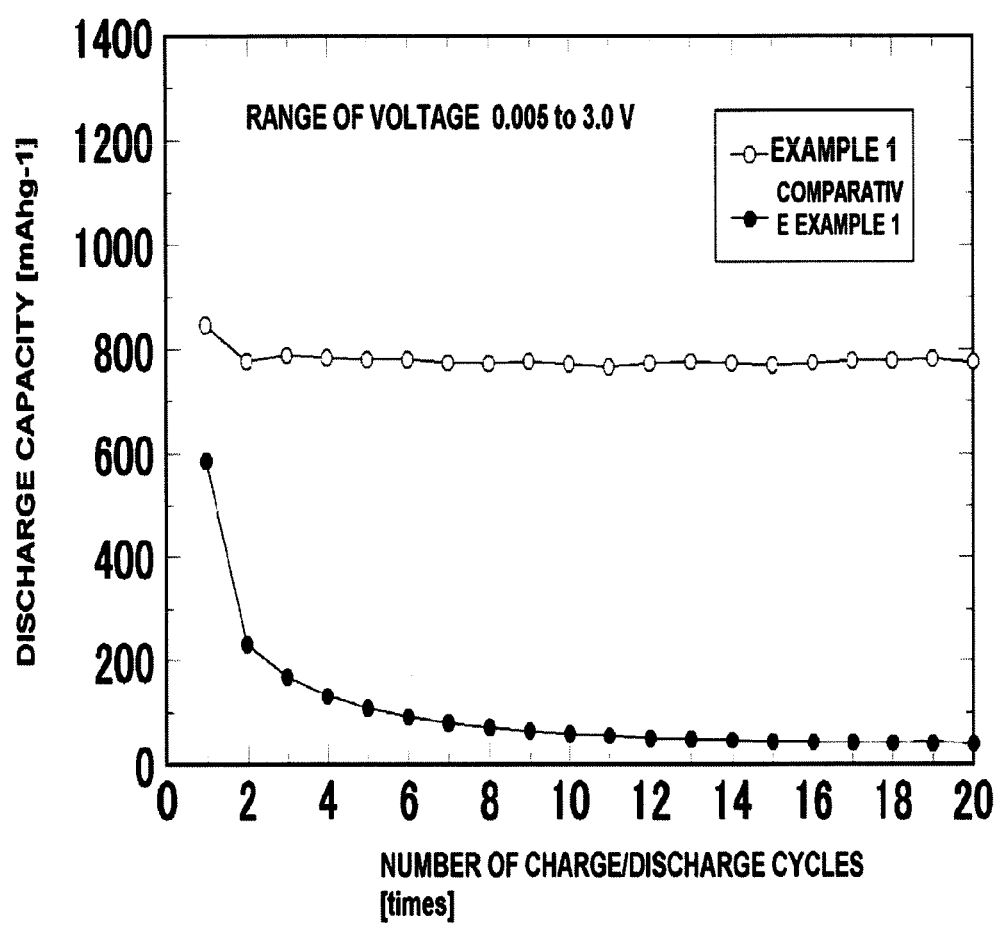
FIG. 4 is a diagram showing a change of a discharge capacity to the number of cycles in each of lithium secondary batteries of Example 1 and Comparative Example 1.

As obvious from FIG. 4, the lithium secondary battery of Comparative Example 1 where the PVdF that has been generally used as a binder component was used displayed high capacity of about 600 mAh/g as the discharge capacity at the first cycle. However, the discharge capacity rapidly deteriorated to about 200 mAh/g at the second cycle.

On the other hand, the lithium secondary battery of Example 1 where a mixture of polyamide acid and partially imidized polyamide acid was used as the binder component displayed 800 mAh/g or more as the discharge capacity at the first cycle, and, also after the second cycle, without displaying the deterioration of the discharge capacity, high capacity of about 800 mAh/g was maintained. That is, an increase in the discharge capacity, an improvement in the charge/discharge efficiency, and excellent cycle stability were confirmed.

The above results are considered due to a factor that when, in place of the conventional PVdF, the binder component of the present invention is used, the electrode layer is inhibited from deteriorating due to the swelling caused by the electrolytic solution, thereby the conductive path can be inhibited from breaking down due to the charge/discharge, further thereby the capacity and charge/discharge efficiency in the initial stage of the charge/discharge test are improved.

Further, in comparison with the conventional PVdF, the binder component of the present invention is higher in the binding property with the current collector and the binding property with the active material inside of the electrode layer. Accordingly, the electrode layer structure could be inhibited from breaking down due to the volume expansion and contraction caused by a conversion electrode reaction of $\alpha$-$Fe_2O_3$ particles during charge and discharge. This is considered a factor of improving the cycle characteristics.

The result like this is inferred due to use of the binder component that fulfills a function of maintaining over a long period of time, even when a large volume change due to a conversion electrode reaction of $\alpha$-$Fe_2O_3$ particles used in the active material is caused, excellent adhesiveness at a boundary between the current collector and the electrode layer, and contacts between materials configuring the electrode layer inside of the electrode layer, and, the sparse and dense configuration where the binder component is effectively distributed inside of the electrode layer.

Further, as obvious from FIG. 5, it is found that when the content of the binder component inside of the electrode layer is optimized, high capacity close to the theoretical capacity of $\alpha$-$Fe_2O_3$ is achieved.

In Example 4 where the content of the binder component is such high as 30% by weight, different from other Examples, an abrupt decrease in capacity is caused. This is inferred that an excessive amount of the binder component covers a region on the side of the electrolytic solution of the electrode layer, thereby the permeability of the electrolytic solution to the electrode layer is deteriorated to result in a decrease in an electrode reaction area.

Also from results like this, it is obvious that the content and distribution of the binder component inside of the electrode layer strongly affect the electrode performance.

Also in the Coulombic efficiency (this means high charge/discharge efficiency at the first cycle, namely, a decrease in irreversible capacity) at the first cycle, the conductive path is inhibited from breaking down, and by making the distribution of the binder component in an upper part of the electrode layer that is the electrolytic solution side sparse, the permeability of the electrolytic solution and an electrode reaction area are increased. As the result thereof, a battery having not only high cycle stability but also high capacity was obtained.

In particular, as shown in FIG. 6, when a charge current value is fixed and a discharge current value is changed, the Coulombic efficiency (charge/discharge efficiency) on a low current side reaches 85% or more and exceeds the theoretical capacity of 1007 mAh/g. From this, it became obvious that the present invention has high potential as a negative electrode for a lithium secondary battery.

Examples 5 and 6

Except that current collectors having a coating film were vacuum dried (heat treatment) at 120° C. (Example 5) and 200° C. (Example 6), in a manner similar to Example 1, negative electrodes configured of a current collector and an electrode layer formed on the current collector were obtained. A thickness of the electrode layer in each of the resulted negative electrodes was 12.7 μm for Example 5 and 12 μm for Example 6. The rate of imidization in the binder component in each of the resulted electrode layers was obtained indirectly by use of the TG curve shown in FIG. 2. The rate of imidization of Example 5 was about 2%, and the rate of imidization of Example 6 was about 30%. Subsequently, in a manner similar to Example 1, coin lithium secondary batteries were prepared.

<Comparison Test and Evaluation 2>

Figure 7:
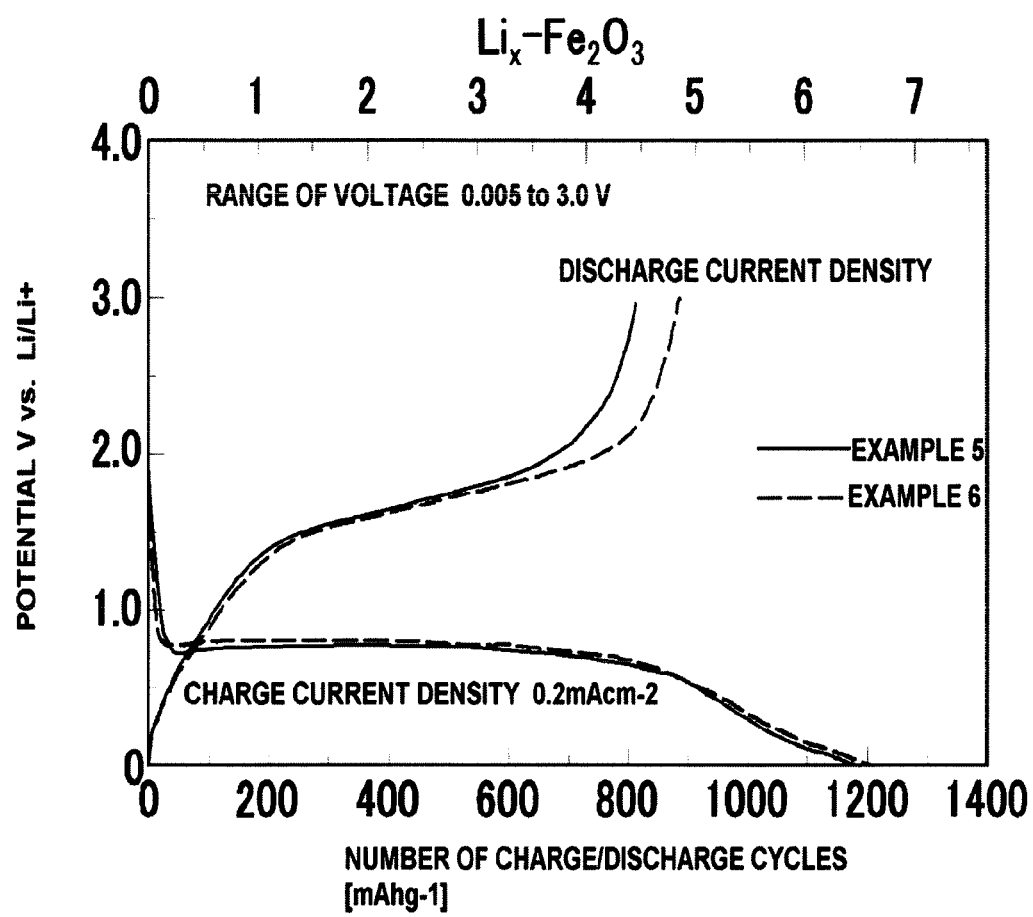
FIG. 7 is a diagram showing the charge/discharge efficiencies (Coulombic efficiency) of lithium secondary batteries of Examples 5 and 6.
Figure 8:
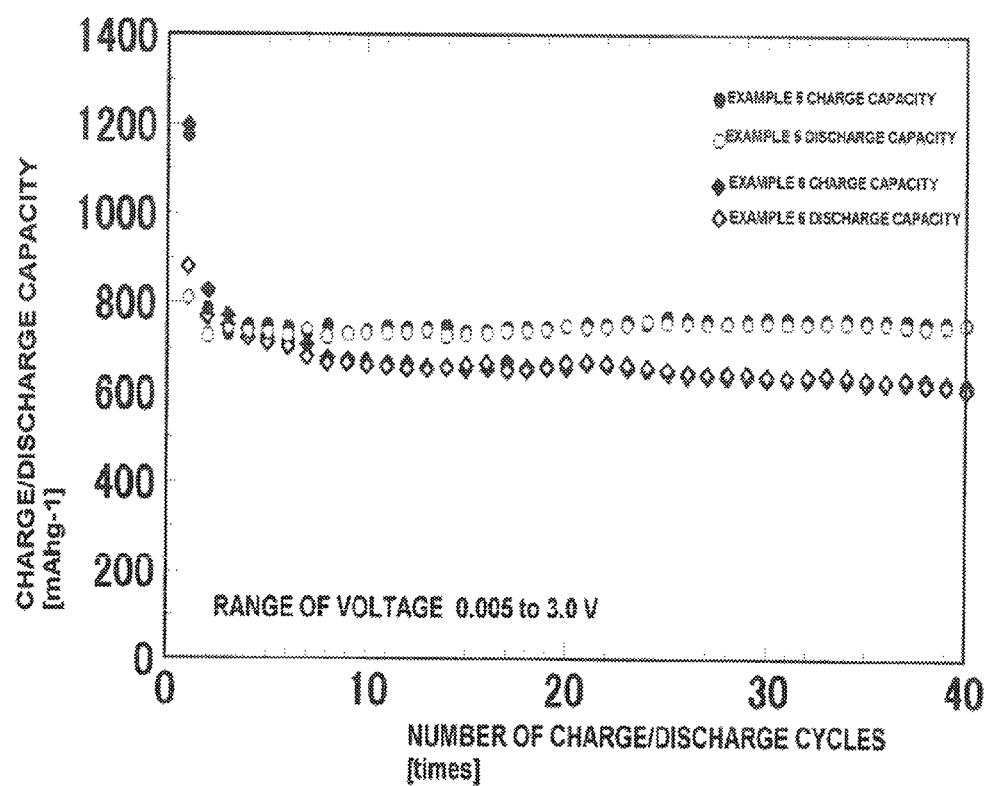
FIG. 8 is a diagram showing a change of the discharge capacity to the number of cycles in each of lithium secondary batteries of Examples 5 and 6.
Figure 9:
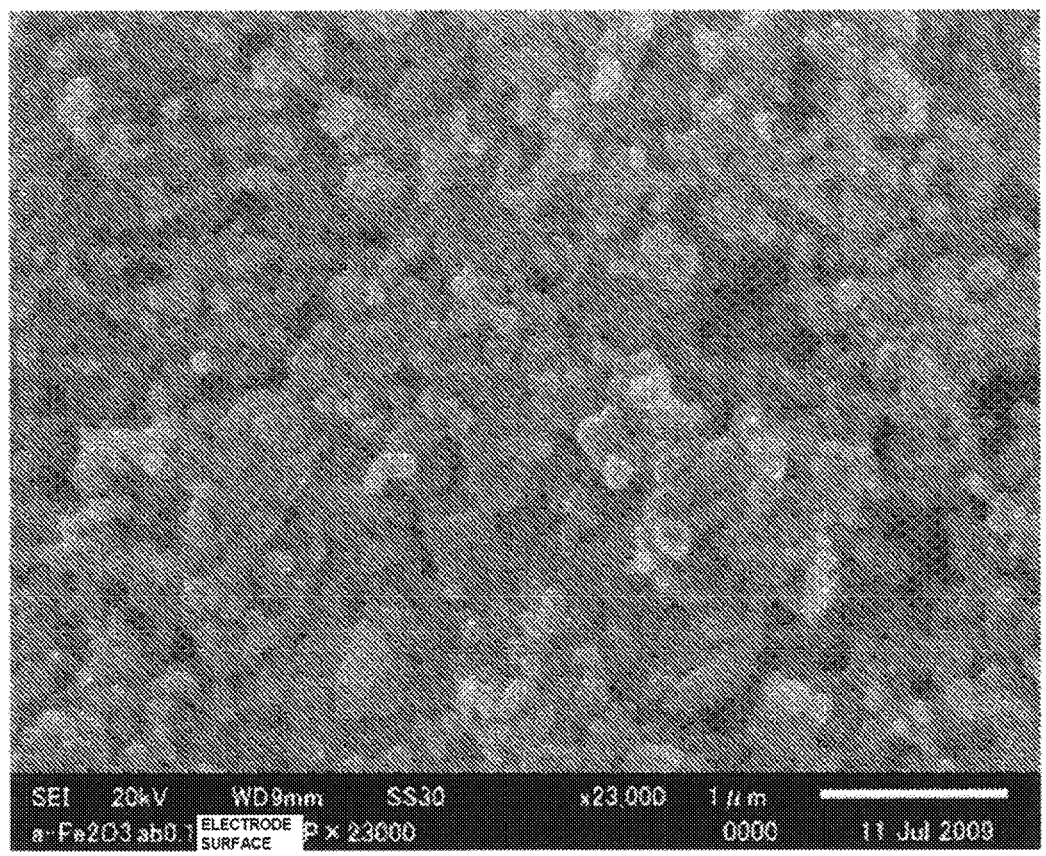
FIG. 9 is an electron micrograph on a surface of a negative electrode of Example 1.
Figure 10:
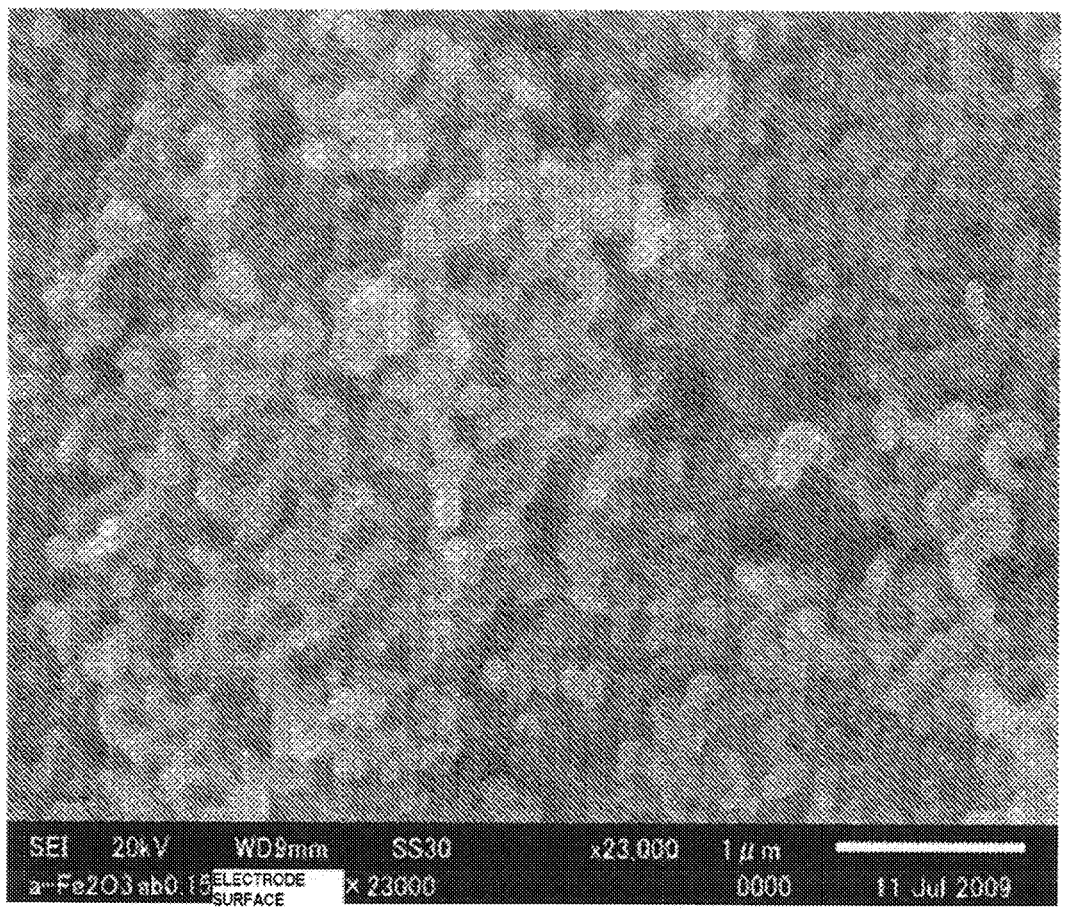
FIG. 10 is an electron micrograph on a surface of a negative electrode of Example 2.
Figure 11:
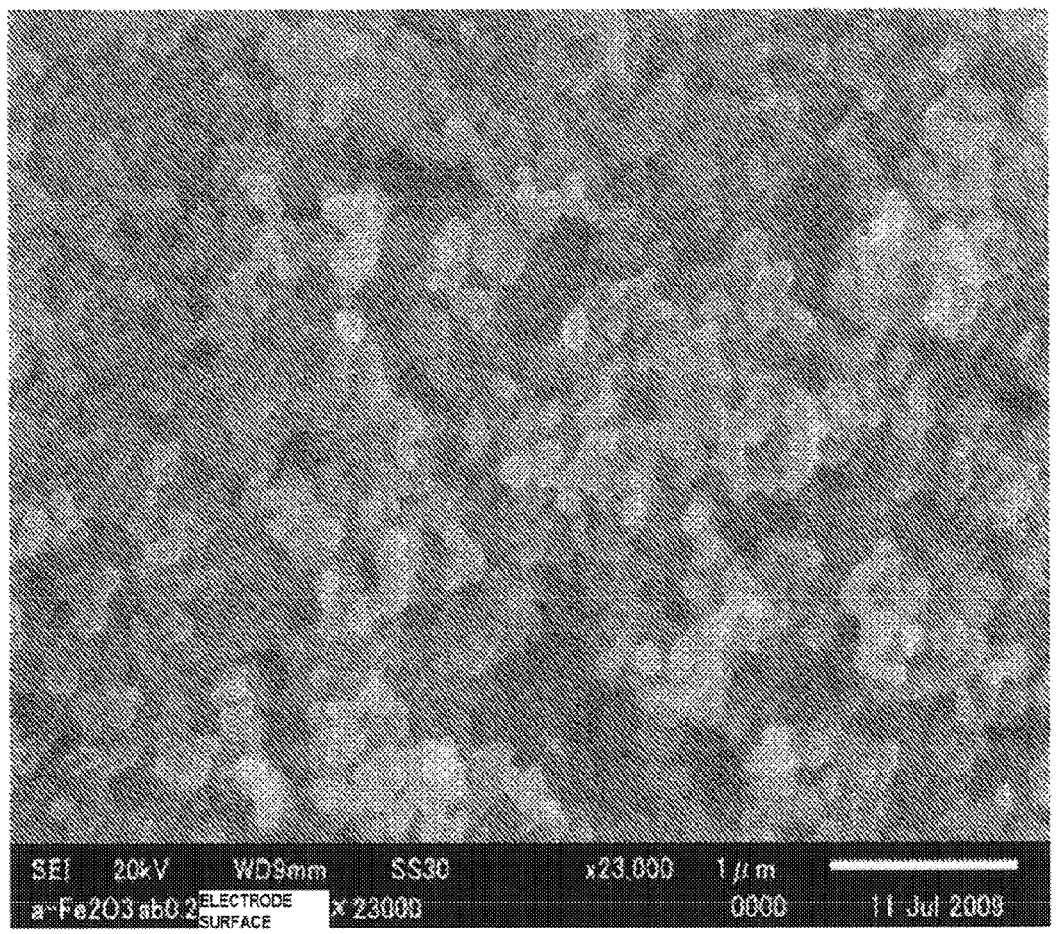
FIG. 11 is an electron micrograph on a surface of a negative electrode of Example 3.
Figure 12:
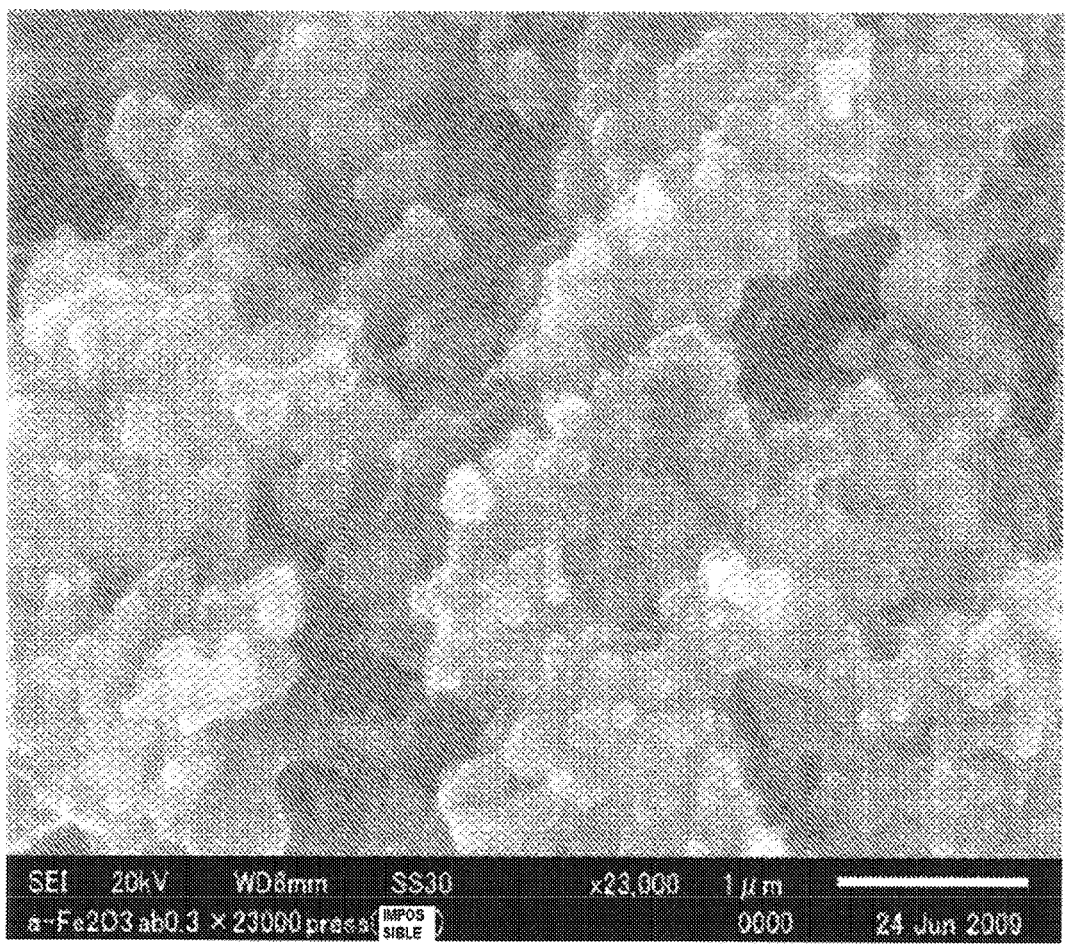
FIG. 12 is an electron micrograph on a surface of a negative electrode of Example 4.

Each of the coin secondary batteries obtained in Examples 5 and 6 was subjected to the cycle characteristics test shown in the following Table 3. The charge/discharge curves at the first cycle in lithium secondary batteries of Examples 5 and 6 are shown in FIG. 7, and a change of the charge/discharge capacity to the number of cycles in the lithium secondary battery of each of Examples 5 and 6 is shown in FIG. 8.

TABLE 3

Test condition for evaluating cycle characteristics

| | |
|---|---|
| Range of voltage: | 0.005 V~3.0 V |
| Charge/discharge current density: | 0.2 mA/cm$^2$ (At the 1st cycle) |
| | 0.5 mA/cm$^2$ (At the 2nd cycle and thereafter) |

As obvious from FIG. 7, in comparison with the lithium secondary battery of Example 5, the lithium secondary battery of Example 6 is higher in the charge/discharge efficiency (Coulombic efficiency) to exhibit an increase in the discharge capacity. From the result, it was found that in order to increase the discharge capacity, the rate of imidization such high as about 30% is preferred to about 2%. In order to completely imidize the binder component, it is necessary to heat to a temperature equal to or more than 350° C. However, it is considered not favorable because at the temperature a copper foil used as a negative electrode current collector is oxidized.

As obvious from FIG. 8, the lithium secondary battery of Example 5 was more excellent in the cycle stability than the lithium secondary battery of Example 6. The reason why the lithium secondary battery of Example 5 where the rate of imidization is lower is superior in the cycle stability is inferred that when the rate of imidization is low, while maintaining the flexibility of a resin film, high binding force can be developed.

<Comparison Test and Evaluation 3>

A surface of each of the negative electrodes of Examples 1 to 4 prepared by varying the binder content respectively was observed with an electron microscope (SEM) before the charge/discharge test. Specifically, by appropriately changing the magnification according to a general method where a test piece is fixed on a sample table with a conductive carbon tape, after depositing platinum or gold, the sample table is introduced in an apparatus, the test piece was observed. Electron micrographs (magnification: 23000 times) of surfaces of the negative electrodes of Examples 1 to 4, respectively, are shown in FIGS. 9 to 12.

As obvious from FIGS. 9 to 12, different from the negative electrodes of Examples 1 to 3 where the content of the binder component is 10 to 20% by weight, in the negative electrode of Example 4 where the content of the binder component is 30% by weight, it was confirmed that the binder component coats α-Fe$_2$O$_3$ particles configuring a surface of the negative electrode.

The result means that as the content of the binder component configuring the electrode layer becomes higher, the binder solid content is present even on the surface of the electrode layer. That is, when the binder solid content excessively coats the surface of the electrode layer, movement of lithium ions and electron conduction path are disturbed to result in an abrupt decrease in capacity, thereby the electrode performance deterioration such as the cycle capacity deterioration and so on may be caused.

Accordingly, it is considered that the binder component on the surface of the electrode layer is better to be present at the minimum amount necessary for connection between the active material particles, and, it is found that in the content of the binder component, a proper range is present. That is, it is considered that, by making the binder solid content dense in the vicinity of the current collector and the electrode layer, the strong adhesiveness with the current collector is realized, and, by making the binder solid content sparse on a surface of the electrode layer, according to the synergy effect thereof, the charge/discharge characteristics (suppression of irreversible capacity at the first cycle, and cycle capacity decrease due to repetition of the charge/discharge) can be improved.

EXPLANATION OF REFERENCE NUMERALS AND SIGNS 10, 21 . . . Negative electrode
11 . . . Negative electrode current collector
12 . . . Negative electrode layer
12a . . . Negative electrode active material (α-Fe$_2$O$_3$ particles)

The invention claimed is:

1. A negative electrode for the lithium secondary battery, comprising
a current collector; and
an electrode layer that is formed on the current collector and contains at least a negative electrode active material, a conductive assistant and a binder component,
wherein the negative electrode active material is composed of α-Fe$_2$O$_3$ particles that generate a conversion electrode reaction and the binder component is a mixture of polyamide acid and partially imidized polyamide acid, a rate of imidization is 0.3 to 30%, and a concentration of the binder component of the electrode layer is configured so that the concentration decreases as distanced from the current collector.

2. A lithium secondary battery comprising the negative electrode according to claim 1.

3. A method for producing a negative electrode for a lithium secondary battery, comprising:
coating a slurry containing at least a negative electrode active material, a conductive assistant, a binder and a solvent on a current collector; and
vacuum drying and pressing the current collector having a coating film to form an electrode layer containing at least the negative electrode active material, the conductive assistant and the binder component on the current collector,
wherein as the negative electrode active material configuring the slurry, α-Fe$_2$O$_3$ particles that generate a conversion electrode reaction are used, and as the binder configuring the slurry, polyamide acid is used, the slurry is adjusted to low viscosity of 2 to 3 Pa·s at room temperature, the binder is allowed to naturally sediment in the coating film formed by coating the prepared low viscosity slurry, thereby a concentration of the binder component in the electrode layer formed on the current collector is configured so as to decrease as distanced from the current collector, and
the binder is partially imidized by vacuum drying and pressing to render the binder component contained in the electrode layer to a mixture of polyamide acid and partially imidized polyamide acid.

4. The method for producing the negative electrode for the lithium secondary battery according to claim 3, wherein a content of the binder component configuring the electrode layer is 3 to 20% by weight.

5. The negative electrode for the lithium secondary battery according to claim 1, wherein a content of the binder component configuring the electrode layer is 3 to 20% by weight.

6. A lithium secondary battery comprising the negative electrode according to claim 1.

7. A lithium secondary battery comprising the negative electrode according to claim 5.

* * * * *